United States Patent [19]

Bangerter et al.

[11] Patent Number: 5,342,632

[45] Date of Patent: Aug. 30, 1994

[54] TREATMENT OF COCOA BEANS FOR IMPROVING FERMENTATION

[75] Inventors: Ulrich Bangerter, Singapore, Singapore; Beng H. Beh, Banting Selangor, Malaysia; Alfred B. Callis, Norwich, Great Britain; Ian J. Pilkington, Banting Selangor, Malaysia

[73] Assignee: Nestec S.A., Vevey, Switzerland

[21] Appl. No.: 138,614

[22] Filed: Oct. 15, 1993

Related U.S. Application Data

[63] Continuation of Ser. No. 646,142, Jan. 25, 1991, abandoned.

[30] Foreign Application Priority Data

Feb. 12, 1990 [EP] European Pat. Off. ......... 90102668.2

[51] Int. Cl.$^5$ ............................................. A23G 1/02
[52] U.S. Cl. ..................................... 426/45; 426/484; 426/507; 426/629; 426/631
[58] Field of Search ................. 426/631, 45, 629, 484, 426/507

[56] References Cited

U.S. PATENT DOCUMENTS 2,558,854 7/1951 Kempf et al. ..................... 426/631
4,938,985 7/1990 Swaine, Jr. et al. ................. 426/599

FOREIGN PATENT DOCUMENTS 2381478 9/1978 France.
WO8505539 12/1985 World Int. Prop. O..

OTHER PUBLICATIONS

Biehl et al, 1989, "Post-harvest Pod Storage; A Method for Pulp Preconditioning to Impair Strong Nib Acidification during Cocoa Fermentation in Malaysia", J. Sci. Food Agric. 1989, vol. 48, pp. 285-304.
Biehl et al, 1989, "Chemical and Physical Changes in the Pulp during Ripening and Post-harvest Storage of Cocoa Pods," J. Sci. Food Agric, vol. 48, pp. 48≧208.
Lehrian, D. "Recent Developments in the Chemistry and Technology of Cocoa Processing" Publication date unknown, Ca. 1989, pp. 22-33.
Biehl, Böle et al, 1989, J. Sci. Food Agric., 1990, Society of Chemical Industry, G. B. vol. 51, 35-45.
Minifie, B. 1982. Chocolate, Cocoa, and Confectionery: Science and Technology, 2nd Ed. Avi Publishing Co. Inc., Westport, Connecticut, pp. 12 and 13.
Rubber Growers Association ("RGA") Cocoa Committee-Cocoa Quality Sub-Committee Minutes (1976).
Chong, et al., "Mitigation of Cocoa Bean Acidity-Fermentary Investigations," Proc., Int.Conf. Cocoa and Coconuts-Kumlalumour, pp. 387-414 (1978).
Shamsudin et al., "Preliminary Efforts to Improve the Quality of Cocoa Beans," Proc. Int. Conf. on Cocoa and Coconuts-Kualalumpur,pp. 415-424 (1978).
Department of Agriculture, Sabah, Malaysia, Leaflet No. 609, "Raw Cocoa Bean Processing and Quality" (1986).
Lewis et al., "The Influence of Harvesting, Fermentation and Drying on Cocoa Flavour Quality," The Planter 62, pp. 134-140 (1986).
Said, et al., "Pulp Preconditiong-A New Approach Towards Quality Improvements of Malaysian Cocoa Beans," Proc. MARDI Senior Staff Conf.-Kualalumpur, pp. 35-48 (1988).

(List continued on next page.)

Primary Examiner—Helen Pratt
Attorney, Agent, or Firm—Vogt & O'Donnell

[57] ABSTRACT

Fresh cocoa beans to be fermented are treated by removing and separating the pulp content from the beans in an amount of from 10% to 30% by weight based upon the weight of the fresh beans. The pulp content may be removed and separated from the fresh means by passing the fresh beans dynamically through a depulper apparatus, which may be followed by drying of the depulped beans, or with a hydraulic press followed by drying of the pressed beans, or with a combination of a press and a depulper apparatus.

17 Claims, No Drawings

OTHER PUBLICATIONS

Duncan, et al., "Improvement of Malaysian Cocoa Bean Flavour By Modification of Harvesting, Fermentation and Drying Methods–The Sime Cadbury Process," Cocoa Grower's Bulletin 42, pp. 42–57 (1989).

Said, et al., "Preconditioning of Fresh Cocoa Beans Prior to Fermentation to Improve Quality: & Commerical Approach," The Planter 66, pp. 332–345 (Jul. 1990).

Lopez Alex "Limatacao da prova de corte" no controle de qualidade do cacau Commercial, Revista Theobroma 14(3) pp. 199–207 (1984); and accompanying English translation.

Lopez, Alex "The Cocoa Pulp Soft–Drink Industry In Brazil And Its Influence on Bean Fermentation" 9th Intern. Conference on Cocoa Research, Lome Toga.

Lehrian, D. "Recent Developments in the Chemistry and Technology of Cocoa Processing" Publication unknown, Ca. 1989, pp. 22–33.

Lopez, et al., "Scanning Electron Microsocpy Studies of the Cellular Changes in Raw, Fermented and Dried Cocoa Beans," Food Microstructure, vol. 6(1987), pp. 9–16.

Lopez, "Chemical Changes Occurring During the Processing of Cocoa" Dimick, P. S. (ed.), Cocoa. Biotechnology–Proceedings, Food Sci. Dept., Penn. State University, 1986, pp. 19–53.

TREATMENT OF COCOA BEANS FOR IMPROVING FERMENTATION

This application is a continuation of application Ser. No. 07/646,142, filed Jan. 25, 1991, now abandoned.

BACKGROUND OF THE INVENTION

The present invention relates to a process of fermenting cocoa beans.

Chocolate and cocoa products are derived from the cocoa tree "*Theobroma cacao*", whose fruit consists of pods each of which contains about 35 seeds, commonly referred to as the cocoa beans, which are coated with a sweet mucilaginous pulp. In order to prepare the cocoa beans for the manufacture of chocolate and cocoa products, the cocoa beans are traditionally fermented together with the pulp and then dried. Fermentation is a key operation in developing the colour, flavour and aroma of the beans. If the fermentation process is not well conducted, the flavour will be weak in intensity and often spoiled by acidity and/or off-flavours.

Without fermentation, good flavour characteristics are practically non-existent and extreme astringency is perceived.

There are several fermentation systems, depending on the cocoa variety and the country of origin. A standard process existing in Malaysia involves placing fresh cocoa beans with their coating of pulp in stainless steel press-boxes, reducing the pulp content by pressing with a hydraulic press and then storing overnight under pressure. The beans are tipped into a large fermentation box with a shallow bed depth and fermented for one day, then transferred to a smaller fermentation box with an increased bed depth of the beans and fermented for a further day. This transfer between small boxes is repeated and fermentation is continued for 5 or 6 days. The fermented beans are transferred to a circular dryer and dried for 8 hours at 70° C.–80° C., rested for 12 hours and finally transferred to a rotary drier and dried again for 8 hours at 70° C. to give the dried cocoa beans.

However, Malaysian cocoa beans fermented in this way may have some of the following major disadvantages:
1. high acidity
2. high incidence of off-flavours
3. low chocolate flavour During fermentation, the pulp, containing about 80% water, 18% sugars, 1.5% citric acid, pectin and minor quantities of amino acids and mineral salts, becomes host to a wide range of microbial activities: e.g., yeasts transform sugars into alcohol, acetic acid bacteria will metabolise alcohol into acetic acid, and lactic acid bacteria will change sugars into lactic acid. With the help of pectinolytic enzymes, the pulp loses its mucilaginous nature and much of it drains from the mass as "sweatings". Bean death occurs within two days allowing enzymes and substrates to interact freely inside the nibs. The initial pH within the nibs is about 6.6 but during fermentation the pH falls to below 5 owing to the diffusion of the acids into the nibs. The pH of Malaysian beans is often still below 5 after 5 days of fermentation causing the objectionable high acidity, while prolonging the fermentation beyond 5 or 6 days contributes to a high level of off-flavours in the cocoa bean.

Since the cocoa beans grown in most of Peninsular Malaysia contain a higher amount of pulp than other cocoa beans, e.g., the Amelonado in Ghana, the pulp tends to make the beans stick together so that the fermentation is anaerobic. Various methods have been proposed to reduce the amount of pulp in order to modify the fermentation conditions so that they become more aerobic and more similar to those of other cocoa beans, e.g., Ghana. Such methods include hydraulic pressing, pod storage, sun spreading and a combination of pod storage and sun spreading.

Harrisons Malaysian Plantations Berhad use hydraulic pressing widely in fermentaries but the fermented cocoa beans have the disadvantages indicated above. The pressed beans have a rough exterior with a significant amount of pulp remaining which is unevenly distributed.

Pod storage involves storing harvested pods for periods from 5 to 11 days after which the pods are broken open and although the pulp to nib ratio is reduced substantially, this reduction is inconsistent, resulting in a cocoa with only occasionally improved flavour. In addition, pod storage in the field would leave the pods susceptible to attack from disease and pests such as rats, as well as to theft whereas pod storage in a warehouse is space and time consuming as well as expensive and not feasible on an industrial scale.

Sun spreading involves placing the cocoa beans, fresh or from stored pods, in thin layers (2–3 cm thick) on trays or on a concrete floor in the sun for several hours to evaporate additional moisture. However, the flavour improvements in this cocoa have been found to be inconsistent. In any case, sun-spreading requires a large area and fair weather to be efficient.

SUMMARY OF THE INVENTION

We have now developed methods for pretreating fresh cocoa beans to remove and separate a portion of the pulp content of the fresh beans from the fresh beans to reduce the amount of pulp, which enable the subsequent fermentation to proceed in highly aerobic conditions, favouring acetic acid bacteria over lactic acid bacterial activity, causing the pH to remain above 5 during the fermentation and after which the cocoa beans have low acidity, are substantially free from off-flavours and show an enhanced cocoa flavour.

The freshly harvested cocoa beans are conventionally transported to the fermentary late afternoon and are weighed prior to treatment or overnight storage.

DETAILED DESCRIPTION OF THE INVENTION

According to the present invention, there is provided a method of treating fresh cocoa beans before fermentation which comprises passing the fresh beans dynamically through a depulper to remove up to 80% by weight of pulp based on the original weight of the pulp.

By a depulper we mean a fruit or vegetable depulper which may be operated mechanically or by other means, e.g., ultrasonically.

An example of a mechanical depulper which may be used in this invention is a paddle finisher comprising a perforated cylindrical screen inside which is a paddle or scraper system adapted to rotate, a means for feeding the fresh cocoa beans at an inlet end and a means for removing the depulped cocoa beans at the other end of the cylindrical screen. The perforations in the cylindrical screen are of a size to allow the pulp which is removed from the fresh cocoa beans to pass through but to prevent the depulped beans passing through. The cylindrical screen is usually static and may be positioned with its longitudinal axis horizontal. The paddles are fixed to a longitudinal axle within the cylindrical screen and extend along the length of the cylindrical screen substantially parallel to the axle. The paddles are preferably slightly slanted in such a way that when they rotate, the mass of cocoa beans is held back towards the inlet end. Alternatively, this effect could be achieved by the cylindrical screen sloping upwards from the inlet end. Conveniently, there are two paddles in the cylindrical screen.

The perforations in the cylindrical screen may have a diameter from 1 mm to 12 mm and preferably from 2 mm to 7 mm. The distance of the external longitudinal edges of the paddles from the wall of the cylindrical screen is preferably as small as possible, and advantageously, the longitudinal edges of the paddles are lined with a food grade rubber or other suitable flexible material which just contacts the screen. The speed of rotation of the paddles may vary from 100 to 1000 RPM, preferably from 150 RPM to 500 RPM.

Advantageously, the machine parts are made of stainless steel. Preferably, the fresh beans may be fed into the inlet end of the depulper by mechanical means.

Advantageously, the cocoa beans may be passed through the depulper more than once, preferably together with water. If desired, the use of a depulper may be preceded by a pressing technique, e.g., using a hydraulic press.

The rate at which the cocoa beans are passed through the depulper depends on the size of the machine and is usually faster for a bigger machine. For a small paddle finisher, the rate may be as low as 100 kg/hour or less and for a larger paddle finisher, the rate may be up to 3000 kg/hour, e.g., 1500 to 2500 kg/hour. For a cylindrical screen 60 cm long having a diameter of 21 cm, the cocoa beans may conveniently be passed through the paddle finisher at a rate of from 500 to 1000 and preferably from 650 to 850 kg/hour.

When the depulped beans are passed through the depulper a further time together with water, the amount of water may be up to 0.6 liter and preferably from 0.05 to 0.25 liter per kg of beans.

By using a depulper the pulp is removed substantially uniformly from the beans and the amount of pulp removed from the fresh cocoa beans in the depulper may be from 10 to 30%, preferably from 15 to 28% and more preferably from 20 to 25% by weight based on the original total combined weight of the beans and pulp. This operation may be followed by a predrying step, whereby the total weight loss as pulp may reach 25% to 50%, preferably from 30 to 45% and especially from 35–40% based on the original total combined weight of beans and pulp. The drying step may be carried out in any conventional hot air dryer, such as the circular drier (available at most 5 estate fermentaries), or any alternative drying system (e.g., sun drying), where air between ambient temperature and 70° C., preferably ambient temperature to 50° C., is forced through the cocoa beans for 0.5–5 hours, depending on the amount of cocoa beans.

The cocoa beans treated in accordance with the present invention may be fermented by conventional methods. If the beans are too dry, an appropriate amount of water may be added to the beans for the fermentation to proceed suitably.

Advantageously, the cocoa beans are placed into a fermentation box to give an initial shallow bed depth of from 13 to 30 cm, preferably from 18 to 27 cm and are later transferred, e.g., after 1 day to another fermentation box with an increased bed depth form 16 to 60 cm, preferably from 35 to 50 cm. During fermentation, the cocoa beans treated in accordance with the present invention form a porous mass allowing the fermentation to be highly aerobic.

A shallow bed depth of between 10 cm and 20 cm is especially desirable when the depulped beans have not been subjected to a predrying treatment. In such an instance, the cocoa beans will have been pretreated by either a combination of hydraulic pressing followed by depulping with addition of water or a multiple pass through the paddle finisher with addition of water.

One advantage of the pulp treatment of the present invention is that the fermentation may be completed in 3 to 5 days, preferably 4 days. The fermented beans are afterwards dried.

The drying of cocoa beans fermented as described above may be carried out by conventional means. One advantage of the present invention is that the drying requires much less energy as the cocoa beans are already much cleaner and drier than after the usual fermentation. Preferably, the drying time is kept similar to the standard conditions and the hot air temperature is decreased from 70° C.–80° C. to 55° C.–70° C.

The present invention also provides a method of treating fresh cocoa beans before fermentation which comprises a quick-press stage with a hydraulic press to reduce the pulp content and afterwards predrying at a temperature from ambient to 70° C. to remove further pulp moisture.

By a quick-press stage we mean pressing the beans in press boxes for a short period of time usually from about 5 to 60 minutes, more usually from 15 to 30 minutes until substantially no more juices are pressed out.

The quick-press stage may cause a weight loss of from 10 to 25% from the beans initial weight.

After the quick-press stage the cocoa beans are preferably predried at a temperature from 45° C. to 60° C. for a period of from 30 to 150 minutes, more usually from 50 to 100 minutes depending on the amount of beans. After the predrying stage, the total weight loss is usually from 30 to 40%.

After predrying, the cocoa beans are fermented in highly aerobic conditions over a period of from 3 to 5 days. The initial bed depth is preferably from 13 to 30 cm and the cocoa beans are later transferred, e.g., after 1 day, to fermentation boxes with an increased bed depth from 18 to 50 cm and especially from 30 to 40 cm.

After fermentation, the beans are dried and the drying may, if desired, be carried out by conventional means as described above.

The processes of this invention may be applied to cocoa beans grown in any parts of the world, especially Malaysian cocoa beans such as those grown in Peninsular Malaysia.

The present invention also provides a method of preparing chocolate and cocoa products comprising roasting the dried cocoa beans produced as hereinbefore described in accordance with the invention, cracking, winnowing to remove shells and produce the nibs which are ground to give cocoa liquor which may be used to prepare chocolate or may be pressed to extract cocoa butter and the residual cake pulverised, cooled and sifted to give cocoa powder.

The present invention also provides chocolate and cocoa products prepared from the fresh cocoa beans treated as hereinbefore described in accordance with the present invention.

The chocolate and cocoa products utilising the fresh cocoa beans treated as hereinbefore described in accordance with the invention are of high quality.

EXAMPLES

The following Examples further illustrate the present invention.

EXAMPLE 1

Fresh cocoa beans were passed through a paddle finisher, model 4000 made by Brown Co., equipped with a cylindrical screen 60 cm long and diameter of 21 cm having 3 mm diameter perforations, an inlet for the beans at one end, a pulp outlet underneath and an outlet for depulped beans at the other end. The fresh beans were weighed and passed through at 700–800 kg/hour, and 25% based on the original weight of the fresh beans was separated as a thick pulp.

The depulped beans were predried in a hot air dryer where the beans were loaded onto trays and dried at 40° C.–45° C. in hot air for 90 minutes until a total of over 35% by weight as pulp had been removed from the fresh beans.

The beans were fermented in containers with a bed depth of 30 cms for 3 days with mixing after 1 day and 2 days only. The pH of the beans remained above 5 throughout the fermentation and the beans were dried after 3 days in a hot air dryer where 8 trays of 0.5 m² area were loaded each with 10 kg of fermented beans. A mild air flow was introduced between the trays and the temperature setting was 55° C. on the first day and 60° C. on the following days. The drying was complete after 3 days.

Chocolate prepared from these beans was found to have low acidity, low off-flavour and enhanced cocoa flavour.

EXAMPLE 2

Fresh cocoa beans were passed through a paddle finisher as in Example 1 and the depulped beans were then passed through a second time together with water in a ratio of 0.5 liter per kg beans to remove further pulp to give an overall pulp weight loss of 27.7% based on the original weight of the beans.

The depulped beans were then fermented in containers with a bed depth of 17 cm for 3 days and dried as in Example 1.

Chocolate prepared from these dried beans had low acidity, low off-flavour and enhanced cocoa flavour.

EXAMPLE 3

130 kg fresh cocoa beans were loaded into a cylindrical perforated stainless steel basket with a solid plastic cover. The beans were pressed by means of a Bucher hydraulic press, the piston pressure of 150 bars being transferred through the plastic cover where it corresponds to a pressure of 12 bars on the beans. The pressing operation took 5 minutes. After shuffling the beans, a second pressing was carried out under the same conditions to reduce the pulp content more evenly throughout the mass. The overall weight loss was 20% based on the original weight of the beans.

The pressed beans were then treated as in Example 2 by passing through a paddle finisher with water to remove further pulp to give an overall weight loss of 26.5% followed by fermentation and drying as in Example 2.

Chocolate prepared from these dried beans has low acidity, low off-flavour and enhanced cocoa flavour.

EXAMPLE 4

Fresh cocoa beans were loaded at the plantation into stainless steel pressboxes at approximately 700 kg in each box. The fully loaded pressboxes were transported to the fermentary in the late afternoon and weighed prior to being left overnight. The next morning the contents of two pressboxes of cocoa beans were passed through the paddle finisher with addition of 60 kg water evenly distributed. The depulped beans were weighed and had lost 25.3% weight as pulp based on the original fresh bean weight.

The depulped beans were placed in a circular dryer, commonly used for industrial drying of fermented cocoa beans, for 65 minutes. The air flow forced through the 5 cm layer of cocoa beans was set at between 50° C.–55° C.

After the predrying, the beans weight was recorded and the overall (cumulative) weight loss had reached 38% based on the original fresh bean weight.

These pretreated cocoa beans were placed into the usual fermentation nets and large boxes (3.1 m × 1.75 m) for approximately 20 hours fermentation at a bed depth of 22 cm. Afterwards, the same beans were transferred to the normal size fermentation boxes (1.75 m × 1.75 m) for another 3 days at a bed depth of 38 cm. At the end of the fermentation period (total of 4 days) the fermented cocoa beans were dried in the circular dryer at 65° C. for 8 hours. A resting period followed (12 hours) and then the cocoa beans were dried further to the final moisture of 7% in the usual rotary drier.

Chocolate prepared from these dried beans had low acidity, low off-flavour and enhanced cocoa flavour.

EXAMPLE 5

Fresh cocoa beans were harvested, delivered and weighed as in Example 4. On the next morning they were subjected to a quick-press by the hydraulic press. The quick-pressed beans were weighed and a 19.8% weight loss as cocoa juice was recorded. The quick-pressed beans were then placed into the circular drier for predrying as in Example 4. After predrying they were again weighed and an overall weight loss of 35.5% was recorded. The cocoa beans then underwent a fermentation process and a drying process as described in Example 4.

Chocolate prepared from these dried beans had low acidity, low off-flavour and enhanced cocoa flavour.

EXAMPLE 6

Fresh cocoa beans were harvested, delivered and weighed as in Example 4. The contents of these pressboxes were passed through the paddle finisher the next morning, with the addition of water as in Example 4. The depulped beans were weighed and a 24.8% weight loss recorded.

The depulped beans were thinly and evenly spread in the sun for 105 minutes. When weighed after this predrying, the cumulative weight loss was 38.5%.

The treated beans were fermented and dried as described in Example 4.

Chocolate prepared from these dried beans had low acidity, low off-flavour and enhanced cocoa flavour.

We claim:

1. A process for treating cocoa beans comprising passing fresh cocoa beans dynamically through a depulper apparatus for removing and separating a portion of the pulp content of the fresh beans from the fresh beans in an amount of from 10% to 30% by weight based upon the weight of the fresh beans to provide partially depulped beans, drying the partially depulped beans to obtain partially dried depulped beans having a weight which is from 50% to 75% by weight of the weight of the fresh beans and then fermenting the partially dried depulped beans.

2. A process according to claim 1 wherein the partially depulped beans are dried at a temperature of from ambient temperature to 70° C.

3. A process according to claim 1 wherein the partially depulped beans are dried by forcing air at a temperature of from ambient temperature to 70° C. through the depulped beans for from 0.5 hours to 5 hours.

4. A process according to claim 1 wherein the depulper apparatus is comprised of a cylindrical screen and paddles contained within the cylindrical screen for dynamically passing the beans within and through the cylindrical screen and for removing the pulp content from the beans wherein the screen has perforations of a size which allow the removed and separated pulp content to pass through but which prevents the partially depulped beans from passing through.

5. A process according to claim 1 wherein the fresh beans are passed through the depulper apparatus more than once to obtain the partially depulped beans.

6. A process according to claim 5 wherein the fresh beans are passed with water through the depulper apparatus to obtain the partially depulped beans.

7. A process according to claim 1 or 6 wherein the partially dried depulped beans are fermented in a bed having a depth of from 10 cm to 20 cm.

8. A process according to claim 1 or 5 wherein the partially dried depulped beans are fermented first in a bed having a depth of from 13 cm to 30 cm and then fermented in a bed having a bed depth of from 16 cm to 60 cm.

9. A process according to claim 1 wherein from 20% to 30% by weight pulp is removed and separated from the fresh beans.

10. A process for treating cocoa beans comprising first pressing fresh cocoa beans and then passing the pressed beans with water dynamically through a depulper apparatus for removing and separating a portion of the pulp content of the fresh beans from the fresh beans in an amount of from 10% to 30% by weight based upon the weight of the fresh beans to provide partially depulped beans, and then fermenting the partially depulped beans.

11. A process according to claim 10 wherein the partially depulped beans are fermented in a bed having a depth of from 10 cm to 20 cm.

12. A process according to claim 10 wherein from 20% to 30% by weight pulp is removed and separated from the fresh beans.

13. A process for treating cocoa beans comprising pressing fresh cocoa beans with a hydraulic press for from 5 minutes to 60 minutes to effect a weight loss of from 10% to 25% by weight based upon the weight of the fresh beans, drying the pressed beans at a temperature of from ambient to 70° C. to remove further moisture from the pressed beans and then fermenting the pressed, dried beans.

14. A process according to claim 13 wherein the pressed beans are dried to obtain a weight loss of from 30% to 40% by weight based upon the weight of the fresh beans.

15. A process according to claim 13 wherein the pressed beans are dried at a temperature of from 45° C. to 60° C. for from 30 minutes to 150 minutes.

16. A process according to claim 13 or 14 wherein during fermentation, the pressed, dried beans are fermented first in a bed having a depth of from 13 cm to 30 cm and then fermented in a bed having a depth of from 18 cm to 50 cm.

17. A process according to claim 1, 13, or 14 wherein the cocoa beans are Malaysian cocoa bean.

* * * * *